(12) United States Patent
Fribus et al.

(10) Patent No.: US 10,598,273 B2
(45) Date of Patent: Mar. 24, 2020

(54) ACTUATING APPARATUS FOR SELECTING GEARS FOR A GEAR CHANGE TRANSMISSION AND METHOD FOR BLOCKING AN ACTUATING APPARATUS

(71) Applicant: ZF Friedrichshafen AG, Friedrichshafen (DE)

(72) Inventors: Vitali Fribus, Quakenbrück (DE); Karsten Straßburg, Hannover (DE); Ludger Rake, Steinfeld (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 15/316,462

(22) PCT Filed: Apr. 27, 2015

(86) PCT No.: PCT/EP2015/059019
§ 371 (c)(1),
(2) Date: Dec. 6, 2016

(87) PCT Pub. No.: WO2015/185281
PCT Pub. Date: Dec. 10, 2015

(65) Prior Publication Data
US 2017/0159799 A1 Jun. 8, 2017

(30) Foreign Application Priority Data

Jun. 6, 2014 (DE) .................. 10 2014 210 827

(51) Int. Cl.
*F16H 59/02* (2006.01)
*F16H 59/10* (2006.01)
(Continued)

(52) U.S. Cl.
CPC ....... *F16H 59/0204* (2013.01); *F16H 59/105* (2013.01); *F16H 61/22* (2013.01);
(Continued)

(58) Field of Classification Search
CPC ......... F16H 59/0204; F16H 2059/0282; F16H 2059/0295; F16H 2059/047; F16H 61/22;
(Continued)

(56) References Cited

U.S. PATENT DOCUMENTS

| 6,237,435 | B1 * | 5/2001 | Gronhage | ........... F16H 59/0204 74/471 XY |
| 6,848,331 | B2 * | 2/2005 | Syamoto | ............. F16H 59/0204 74/473.18 |

(Continued)

FOREIGN PATENT DOCUMENTS

| DE | 102005053610 A1 | 5/2007 |
| DE | 102007015375 A1 | 10/2008 |

(Continued)

OTHER PUBLICATIONS

German Office Action dated Feb. 27, 2015 for German Patent Application No. DE 10 2014 210 827.6 (German language), 7 pages.

(Continued)

*Primary Examiner* — Victor L MacArthur
*Assistant Examiner* — Joseph Brown
(74) *Attorney, Agent, or Firm* — Brinks Gilson & Lione (57) ABSTRACT

An actuating device for selecting gears for a change gear transmission, in particular for an automatic transmission with shift-by-wire actuation, wherein a selector lever of the actuating device is movable in a main shift track and a touch-shift track and between the main shift track and the touch-shift track in a changing track, wherein the actuating device comprises a latch mechanism acting on the selector lever, characterized by a locking device comprising a locking gate, an actuator and a locking bolt guided through the actuator, wherein the locking gate comprises at least one locking recess, wherein at one position of the selector lever (Continued)

within the main shift track the locking bolt is movable by the actuator and the locking bolt is configured to engage in the locking recess, wherein the locking device comprises a spring, wherein a holding force caused by the spring is greater than a restoring force of the latch mechanism of the actuating device acting from a position of the selector lever in the touch-shift track to a position in the main shift track, and wherein the spring is configured to act against a movement of the selector lever from the touch-shift track to the main shift track, when the selector lever is positioned in the touch-shift track.

15 Claims, 5 Drawing Sheets

(51) Int. Cl.
  *F16H 61/22* (2006.01)
  *F16H 61/24* (2006.01)
  *F16H 59/04* (2006.01)

(52) U.S. Cl.
  CPC ..... *F16H 61/24* (2013.01); *F16H 2059/0269* (2013.01); *F16H 2059/0295* (2013.01); *F16H 2059/047* (2013.01); *F16H 2061/223* (2013.01); *F16H 2061/245* (2013.01)

(58) Field of Classification Search
  CPC ................. F16H 61/24; F16H 63/3475; F16H 2059/0269; F16H 2061/223
  USPC ............................ 74/473.18, 473.21, 473.28
  See application file for complete search history.

(56) References Cited

U.S. PATENT DOCUMENTS

| | | | |
|---|---|---|---|
| 7,086,306 B2* | 8/2006 | Syamoto | F16H 59/0204 74/471 XY |
| 2006/0016286 A1* | 1/2006 | De Jonge | F16H 59/0204 74/473.18 |
| 2007/0234837 A1* | 10/2007 | Russell | F16H 59/10 74/473.12 |
| 2008/0163714 A1* | 7/2008 | Wang | F16H 61/24 74/473.23 |

FOREIGN PATENT DOCUMENTS

| | | | | |
|---|---|---|---|---|
| DE | 102007058850 A1 | | 6/2009 | |
| DE | 102008041374 A1 | | 2/2010 | |
| EP | 2172674 A2 | | 4/2010 | |
| EP | 2792910 A | | 10/2014 | |
| JP | 11078576 A | * | 3/1999 | ......... F16H 59/0204 |
| JP | H1178576 A | | 3/1999 | |
| WO | WO-2013076517 A1 | * | 5/2013 | ......... F16H 59/0204 |

OTHER PUBLICATIONS

English translation of p. 7 of German Office Action dated Feb. 27, 2015 for German Patent Application No. DE 10 2014 210 827.6 (2 pages).
International Search Report and Written Opinion dated Jun. 29, 2015 for PCT/EP2015/059019 (German language, 10 pages).
International Search Report dated Jun. 29, 2015 for PCT/EP2015/059019 (English language, 2 pages).
English Translation of Written Opinion of the International Searching Authority for International Patent Application No. PCT/EP2015/059019, 11 pages.

* cited by examiner

ACTUATING APPARATUS FOR SELECTING GEARS FOR A GEAR CHANGE TRANSMISSION AND METHOD FOR BLOCKING AN ACTUATING APPARATUS

RELATED APPLICATIONS

This application is a filing under 35 U.S.C. § 371 of International Patent Application PCT/EP2015/059019, filed Apr. 27, 2015, and claims the benefit and priority of German Patent Application DE 10 2014 210 827.6, filed Jun. 6, 2014, both of which are incorporated by reference herein in their entirety.

BACKGROUND

1. Technical Field

The present invention relates to an actuating device for selecting gears for a change gear transmission and a method for locking an actuating device.

2. Background Information

Change gear transmission of motor vehicles are usually controlled or shifted by means of an actuating device arranged within reach of the driver. Actuation usually means that such a lever or a selector lever is used, which is arranged for example between the front seats of the motor vehicle. Automatic transmissions in which the transmission is switched with the shift-by-wire technology, are considered known.

DE 10 2007 015 375 A1 discloses an actuating device for selecting gears of a shift-by-wire change gear transmission with a selector lever return.

BRIEF SUMMARY

Against this background, the present invention provides an improved actuating device for selecting gears for a change gear transmission and a corresponding method for locking an actuating device according to the independent claims. Advantageous embodiments result from the dependent claims and the following description.

A selector lever of an actuating device for the selection of gears can be locked in a main shift track or automatic shift track or alternatively in a touch-shift track by a locking contour. The locking contour creates a mechanical locking, which can be activated via an actuator. Advantageously, a so-called auto P function can be realized at low cost in conjunction with a means not further described here. If the selector lever is in the main shift track, a shift in the main shift track is also possible with activated locking contour. The same applies for a position in the touch-shift track and a shift within the touch-shift track. Advantageously, when applying an additional lateral force, with activated locking contour the selector lever can be moved from the touch-shift track to the main shift track.

This invention presents an actuating device for selecting gears for a change gear transmission, in particular for an automatic transmission with shift-by-wire actuation, wherein a selector lever of the actuating device is movable in an alternating lane in a main shift track and a touch-shift track and between the main shift track and the touch-shift track, wherein the actuating device comprises a locking device acting on the selector lever, characterized by a locking device comprising a locking guide, an actuator and a locking bolt conducted through the actuator, wherein the locking guide has at least one locking recess, wherein at a position of the selector lever within the main shift track the locking bolt is movable by the actuator and the locking bolt is designed to engage in the locking recess, wherein the locking device comprises a spring, wherein a holding force caused by the spring is greater than a restoring force of the locking device of the actuating device acting from a position of the selector lever in the touch-shift track to a position in the main shift track and wherein the spring is designed to act against a movement of the selector lever from the touch-shift track to the main shift track when the selector lever is positioned in the touch-shift track.

Vehicles, especially motor vehicles, can be equipped with a change gear transmission. Change gear transmissions can be also used for power transmission in stationary combustion engines. In a vehicle with a change gear transmission may be, for example, a road vehicle such as a passenger car, a truck, a tractor, machinery or a motorcycle, or an aircraft, a ship or a rail vehicle. The change gear transmission may thus be a transmission of a vehicle. The actuating device may comprise a locking device with a locking bolt, whose tip slides spring-loaded in a latching guide. It may be formed in accordance with the traditional operating concept as a multi stable operating element with stable selector lever positions of the selector lever. In the touch-shift track, the selector lever may be formed as a monostable actuator to always return again to a pre-defined middle position after each actuation. Under a touch-shift track as well as under a main shift track can be understood a locking track. The locking device may be disposed, formed and designed to guide the selector lever, to press against the selector lever and/or to enable a resistance or a sensory, in particular haptic feedback with respect to a movement or shift position thereof during the switching operations. The selector lever can for example be operated by hand by a driver of the vehicle to set different speed steps or gears of the automatic transmission. For example, the movement of the control element can take place between switching positions or the positions P for parking, N for neutral, R for reverse driving and D for driving as well as from D to a touch-shift track. The touch-shift track can be referred to as manual track or shift track. When the selector lever of the actuating device is in the main shift track, for example, the (automatic) shifting positions P, N, R, D can be selected. In an automatic transmission with shift-by-wire actuation it may be a transmission with an electric actuator, wherein there is no mechanical coupling between the actuating device for example in the passenger compartment and the transmission for example in the engine compartment. Thus, the switching commands can be transmitted from the actuating device to the transmission exclusively by means of electrical or electronic signals, and then the switching commands can be implemented, for example, in electro-hydraulic way. If the transmission is an automatic transmission, it may comprise a so-called auto P function which makes sure that in certain circumstances such as when leaving the vehicle, the parking brake can be always engaged in the transmission to prevent the unattended vehicle from rolling away. Thus, the auto P function can ensure that in a particular situation a parking lock is engaged in the transmission, independently of a real gear selected on the selector lever. In another driving situation, a selector lever placed in the touch-shift track can be automatically moved to the main shift track to meet the driving situation or to subsequently activate a security function. Thus, a discrepancy between a selector lever position and a transmission state can be compensated so as to avoid unwanted faulty operation or fail-circuiting by a driver.

The locking device can be formed to guide the selector lever in the main shift track, the touch-shift track or the connecting track or to lock in a movement. Here, a state of the actuator of the locking device can influence a function of locking device. The actuator can move the locking bolt, for example, electrically, electro-pneumatically or electro-hydraulically depending on the design. In this case, the locking bolt can engage in the locking gate and be held or guided by the locking gate. In particular, the locking bolt can engage in a recess or a lock recess of the locking gate. The locking recess can be a bore, a recess, a groove or a different type of depression in the locking gate.

Under the spring can be generally understood an elastically restoring spring element. Here, the spring element can exert a spring force or a holding force mechanically, by an electric motor, electro-magnetically or pneumatically. The spring can act on an element of the locking device and thus exert a holding force on the locking device. The holding force can cause the locking device to be held in a position as long as no force greater than the holding force is applied to an element of the actuating device.

It is also favorable, if in an embodiment the actuator is formed as an electromagnet. The locking bolt can be actively moved by the actuator between two end positions. Thus, the actuator can be activated by a simple electrical control signal.

Further, the locking gate can have another locking recess. A side wall of the further locking recess arranged in the direction of the locking recess may be at least partially aligned obliquely to a direction of movement of the locking bolt. Thus the side wall of the further locking recess arranged in the direction of the locking recess may comprise at least one part having an angle between 30° and 60° to the direction of movement of the locking bolts. The inclined side wall may be formed continuously, that is, the inclined side wall cannot have any kinks. Advantageously, when the selector lever is in the touch-shift track, the locking bolt can be moved to the other locking recess to hold the selector lever in the touch-shift track. Furthermore, upon application of a force exceeding the difference between the force applied by the locking bolt and the retaining force of the locking device the selector lever can be moved from the touch-shift track to the main shift track.

The locking recess of the locking gate can comprise at least partially a side wall aligned substantially parallel to the direction of movement of the locking bolt. Thus, the side wall can be aligned parallel to the movement of the locking bolt within a tolerance range. The tolerance can be up to 10°, up to 30° or up to 45°. The at least partially substantially parallel aligned side wall may be arranged in the direction of the other locking recess. The locking bolt may comprise in a part a rounded shape. The locking bolt may have a chamfer. Advantageously, the locking bolt can hold the selector lever in the main shift track when it engages in the locking recess of the locking gate.

The locking recess may have a longitudinal extension. The locking recess can be aligned parallel to the main track shift within a tolerance range. The other locking recess may have a longitudinal extension. The other locking recess can be aligned parallel to the touch-shift track within a tolerance range. The tolerance range can be plus/minus 10°. Alternatively, the tolerance range can be up to 90°. In particular, the longitudinal extension can have a greater length than the width of the locking recess and/or the further locking recess.

In an embodiment, the locking bolt may comprise a locking pin. Under a locking pin can be understood a bolt. The locking pin may be arranged movable in the actuator in the direction of movement of the locking bolt. The spring may be formed to press the locking pin in the direction of movement of the locking bolt in the direction of the locking gate. The locking bolt may include a locking pin having a rounded and/or round shape in a part engageable in the locking gate.

In a first state of the actuator, the selector lever may be movable in the main shift track. In the first state of the actuator, the selector lever may be movable in the touch-shift track. Furthermore, in the first state of the actuator the selector lever can be movable between the main shift track and the touch-shift track in a changing track. Thus, for example, in the first state the actuator may be movable in the main shift track, the touch-shift track and the changing track. In a second state of actuator, the selector lever may be movable in the main shift track. In the second state of the actuator, the selector lever may be movable in the touch-shift track. In the second state of the actuator, the selector lever can be movable from the main shift track to the touch-shift track. Advantageously, the state of the actuator can influence the possibility of movement or possible movement directions of the selector lever.

In an embodiment, the spring can be designed as a spring operatively connected with the locking bolt. In this case, the spring may be rotatably mounted about a pivot point. A section of the spring can formed rigid between the pivot point and the locking bolt. Advantageously, the holding force of the spring acting on the locking device can be changed by the status of the actuator. The position or location of the spring can be varied by the position of the locking bolt or by the state of the actuator. The spring may be arranged on a side of the locking device or the locking gate opposite to the actuator.

It is also favorable if the spring is designed as a leaf spring. The leaf spring can act directly on the locking device or on a contour of the locking device.

The locking device may comprise a locking lug. The spring or the leaf spring may comprise a leaf spring lug. In a first state of the actuator, the leaf spring lug can be in contact with the locking lug of the locking device.

In a second state of the actuator, the leaf spring lug may be without contact to the locking lug. In the second state of the actuator, the leaf spring lug can exert on the locking lug a lower holding power than the restoring force of the locking device. Thus, the selector lever can be moved by the restoring force of the locking device from the touch-shift track into the main shift track.

In a favorable embodiment, the first state of the actuator represents an activated state. The second state of the actuator may represent a non-activated state of the actuator. Under an activated state can be understood an energized actuator. Under a non-activated state of the actuator can be understood non-energized actuator.

A method for locking a variant of an aforementioned actuating device, in particular for an automatic transmission with shift-by-wire operation, is characterized by the following steps:

Locking the locking device in the touch-shift track, wherein a spring force causing the locking is greater than a restoring force of the locking device of the actuating device; and releasing the locking device so that the selector lever is moved by the restoring force of the locking device from the touch-shift track into the main shift track.

An inventive concept of the featured idea can be implemented efficiently and economically also by the mentioned method.

It is also advantageous if in a step of activating prior to the step of locking the actuator of the locking device is activated in response to a control signal when the selector lever is in the main shift track to lock the selector lever in the main shift track.

It is also advantageous if the method comprises a step of releasing the actuator after the step of releasing the locking device so that the selector lever is movable from the main shift track into the touch-shift track.

A control signal for driving the actuator can be provided by a control unit or a device. An apparatus may be an electrical device which processes electrical signals, such as sensor signals and outputs control signals in response. The apparatus may comprise one or more suitable interfaces that can be configured in the hardware and/or software. In a hardware configuration, the interfaces can for example be part of an integrated circuit, in which in the functions of the device are implemented. The interfaces may also be separate integrated circuits or at least partially composed of discrete components. In a software configuration, the interfaces may be software modules that are present, for example, on a microcontroller in addition to other software modules.

It is also advantageous to include a computer program product with program code which can be stored on a machine readable medium such as a semiconductor memory, a hard disk memory or an optical memory and is used for performing the method according to one of the embodiments described above, when the program is executed on a computer or a device.

BRIEF DESCRIPTION OF THE DRAWINGS

The invention will now be explained in more detail based on the accompanying drawings. The figures show.

DETAILED DESCRIPTION OF THE DRAWINGS AND THE PRESENTLY PREFERRED EMBODIMENTS

In the following description of preferred embodiments of the present invention, the same or similar reference numerals are used for the elements shown in the various figures and similarly acting, wherein a repeated description of these elements is dispensed with.

Figure 1:
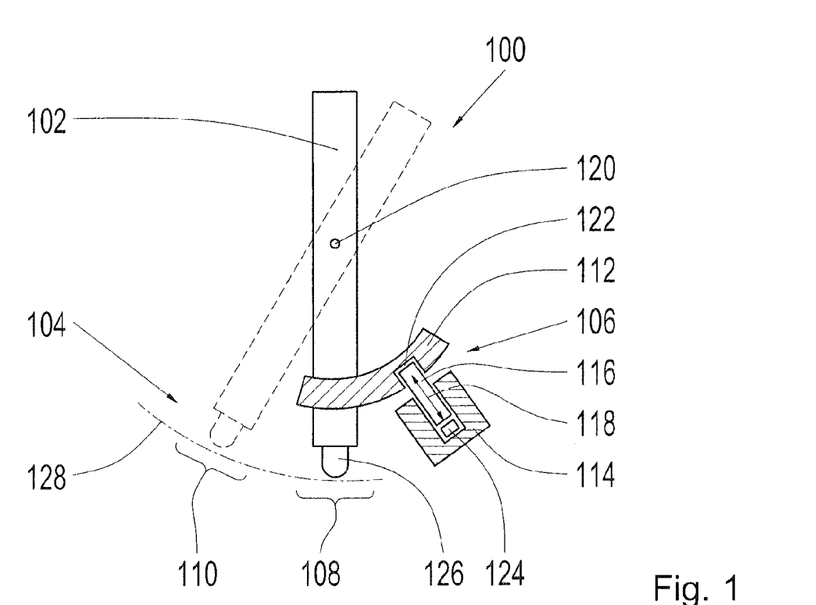
FIG. 1 a section through a schematic actuating device for selection of gears for a change gear transmission according to an embodiment of the present invention.

FIG. 1 shows a section through a schematic actuating device 100 for the selection of gears for a change gear transmission according to an embodiment of the present invention. According to an embodiment not shown, the change gear transmission is an automatic transmission with shift-by-wire actuation, especially for a vehicle.

The actuating device 100 comprises a selector lever 102, a latch mechanism 104, and a locking device 106. The latch mechanism 104 acts on the selector lever 102. The latch mechanism 104 is designed to engage the selector lever 102 in a main shift track 108 and/or in the touch-shift track. The selector lever 102 is movable independently of the latch mechanism 104 in the main shift track 108, in the touch-shift track 110 and in a non-illustrated changing track, wherein a movement through the changing track makes possible a change of the selector lever 102 between the main shift track 108 and the touch-shift track 110.

The locking device 106 includes a locking gate 112, an actuator 114 and a locking bolt 116. The actuator 114 is configured to guide the locking bolt 116 and to move it between two end positions. Here, the direction of movement 118 of the locking bolt 116 is oriented substantially transversely to the main extension of the locking gate 112. In an embodiment, the movement direction 118 is aligned within a tolerance range of 10° radially with respect to a ball joint 120 of the selector lever 102. In this case, in the embodiment shown in FIG. 1, the locking gate 112 has a locking recess 122. At least when the selector lever 102 is located in the main shift track 108, the locking bolt 116 is adapted to engage in the locking recess 122. The locking device 106 comprises a spring 124 operatively connected to the actuator 116. The spring 124 is arranged to exert a holding force on the locking device, which is greater than a restoring force of the latch mechanism 104. The restoring force of the latch mechanism 104 acts on the selector lever 102 at a position of the selector lever 102 in the touch-shift track 110 to move the selector lever 102 from the position in the touch-shift track 110 to a position in the main shift track 108.

In the embodiment shown in FIG. 1, the latch mechanism 104 comprises a spring-loaded locking pin 126 and a latching guide 128.

The actuating device 100 presented in FIG. 1 advantageously creates a cost-effective and a backlash-free concept of a shift-by-wire circuit with auto P function.

The selector lever 102 comprises a locking device 106 arranged on the selector lever 102 as one aspect of the presented idea. In other words, this can be described as a lever 102 with molded locking unit 106. At least one function of the locking unit 106 is to lock the touch-shift track 110 and the main shift track 108. The main shift track 108 is also called automatic shift track 108. The locking of the tracks 108, 110 is realized in a not shown embodiment by means of two locking contours in the locking unit 106. The locking contour is designed so that a switching with the locking bolt 116 extended in the longitudinal direction is free but switching in the transverse direction is blocked. The locking bolt 116 is also referred to as shift lock tappet 116. The auto P function is implemented via the contour of the latching guide 128. This is designed so that the shift lever 102 in the touch-shift track 110 always has the tendency to slip into the automatic shift track 108.

Figure 2:
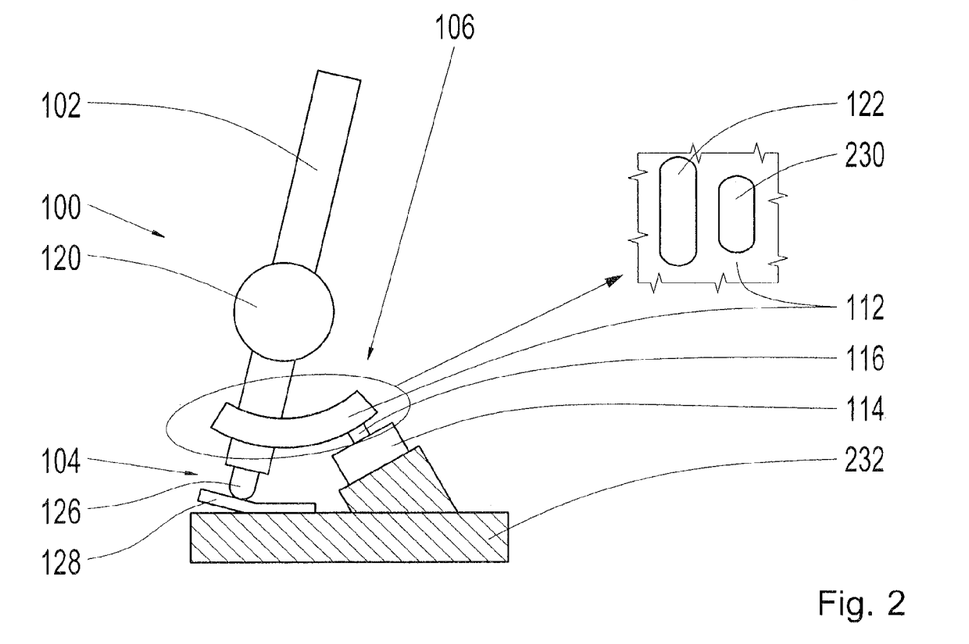
FIG. 2 a section through a schematic actuating device for selecting gears with locking gate according to an embodiment of the present invention.

FIG. 2 shows a section through a schematic actuating device 100 for the selection of gears with locking gate 112 according to an embodiment of the present invention. The actuating device 100 may be an exemplary embodiment of an actuating device 100 shown in FIG. 1. The actuating device 100 comprises a selector lever 102, a latch mechanism 104, and a locking device 106. The selector lever 102 may be referred to as a lever 102. The selector lever 102 is configured to be moved in a main shift track 108 and a touch-shift track 110. The selector lever 102 has a ball joint 120. Furthermore, the selector lever 102 has a receptacle for the locking device 106. In particular, the selector lever 102 is coupled with the locking gate 112. The latch mechanism 104 comprises a latching guide 128 and a locking pin 126. The contour of the latching guide 128 realizes an auto P function. The auto P function is designed such that the selector lever 102 in the touch-shift track 110 always has the tendency to slip into the main shift track 108. For this purpose, the actuating device 100 has a not shown changing track, which is arranged transversely to the main shift track 108 or transversely to the touch-shift track 110 aligned substantially parallel to the main shift track 108. The locking device 106 comprises a locking gate 112, an actuator 114 and a locking bolt 116. In FIG. 2 is shown separately in the upper right corner a section of the locking gate 112. The locking gate 112 has a locking recess 122 for guiding the selector lever 102 in the main shift track 108 and another locking recess 230 for guiding the selector lever 102 in the touch-shift track 110. Thus, the locking recess 122 can also be referred to as a locking of the main shift track and the further locking recess 230 can be referred to as a locking of the touch-shift track. The latching guide 128 and the actuator 114 are connected with each other via a housing 232. Not shown in FIG. 2 is a connection of the housing 232 to the ball joint 120 of the selector lever.

In an embodiment, the actuator 114 is formed as a shift lock solenoid 114.

Figure 3:
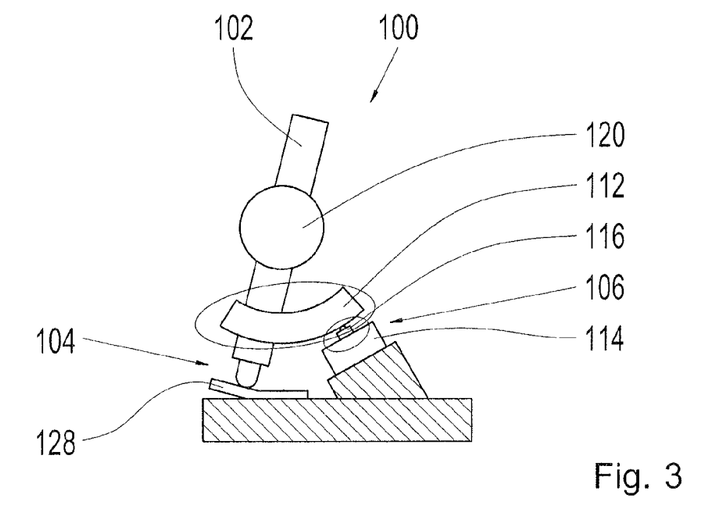
FIG. 3 a section through a schematic actuating device for selecting gears with locking gate according to an embodiment of the present invention.

FIG. 3 shows a section through a schematic actuating device 100 for the selection of gears with locking gate 112 according to an embodiment of the present invention. The actuating device 100 may be an exemplary embodiment of an actuating device 100 shown in the preceding figures. The illustration in FIG. 3 largely corresponds to that shown in FIG. 2, with the difference that the locking gate 112 as a detail is not shown in a plan view in FIG. 3, but is reproduced as a variant of the locking gate 112 in a plan view separately in FIG. 4. The locking device 106 is shown in detail in sectional view in the following figures FIG. 5 to FIG. 7 in different positions of the selector lever 102.

The actuating device 100 comprises a selector lever 102 mounted in a ball joint 120, a latch mechanism 104 and a locking device 106. The locking device 106 comprises an actuator 114, a locking bolt 116 and a locking gate 112.

One aspect of the present invention is the shift lever 102 with molded locking unit 106. The function of the locking unit 106 is the locking of the touch-shift track or the main shift track. The main shift track is referred to as automatic shift track, because a gear shifting is automatically performed at a position of the shift lever 102 in the main shift track.

The locking of the touch-shift track or the main shift track is realized by means of two locking contours in the locking unit 106. By means of the contour of the detent in the touch-shift track, the shift lever 102 is "biased" in the transverse direction (Auto-P). The contour of the locking unit 106 in the main shift track at the extended shift lock tappet 116 allows shifting in the longitudinal direction but at the same time prohibits the shifting in the transverse direction. In the touch-shift track the shift lever 102 is being held by a spring-loaded pin in the shift lock tappet 116. The said spring-loaded pin is shown in the following figures FIG. 5 to FIG. 7 as locking bolt 536. The force exerted by the spring 124 already shown in FIG. 1 on the pin is greater than a restoring force of the locking mechanism 104. The locking contour in the touch-shift track allows with the extended shift lock tappet 116 a manual or with a retracted shiftlock tappet 116 an automatic change of the shift lever 102 from the touch-shift track to the main shift track.

Figure 4:
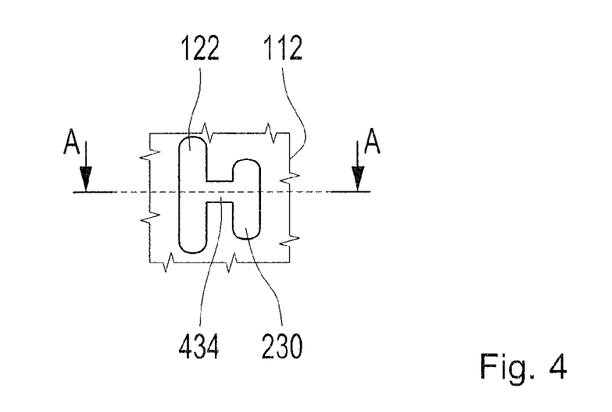
FIG. 4 a top view of a locking gate of a locking device for use in an actuating device according to an embodiment of the present invention.

FIG. 4 shows a plan view of a locking gate 112 of a locking device 106 according to an embodiment of the present invention. The locking device may be a locking device 106 shown in the preceding figures. The locking gate 112 has a locking recess 122 and another locking recess 230. The locking recess 122 and the further locking recess 230 in the embodiment shown in FIG. 4 are aligned substantially parallel to each other. For example, the tolerance of the substantially parallel alignment of the locking recess 122 and the further locking recess 230 may be 10°. The locking recess 122 and the further locking recess 230 are connected by an addition locking recess 434 aligned transversely to them. The locking recesses 122, 230, 434 together have approximately the shape of a letter H.

Figure 5:
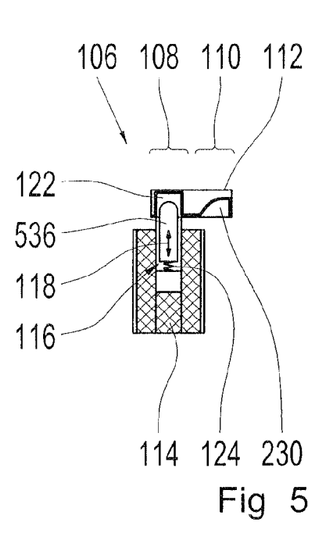
FIG. 5 to FIG. 7 sections through a schematic locking device of an actuating device for selecting gears according to an embodiment of the present invention in different positions of the gear selector lever.
Figure 6:
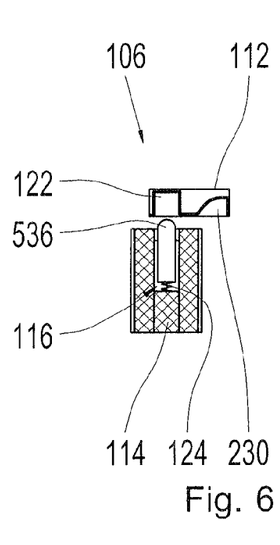
Figure 7:
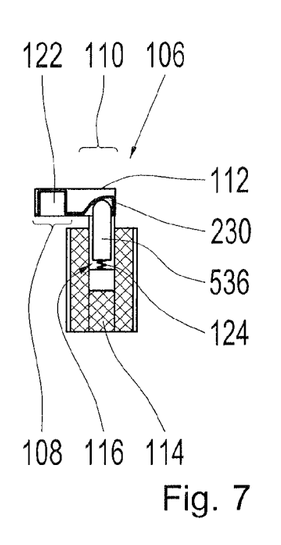

A sectional line AA denotes a cross-sectional plane through the locking gate 112, which is shown in FIG. 5 to FIG. 7. The section along AA extends along the extending direction of the additional locking recess 434 transverse to the extension of the locking recess 122 and the other locking recess 230.

FIG. 5 to FIG. 7 shows a schematic cross-sectional view of a locking device 106 of an actuating device for the selection of gears according to an embodiment of the present invention.

The actuating device may be an actuating device 100 shown in FIG. 1 to FIG. 3. The locking device 106 comprises an actuator 114, a locking bolt 116 and a locking gate 112. Furthermore, the locking device 106 comprises a spring 124 and a locking pin 534. The locking device 106 shown in FIG. 5 to FIG. 7 is characterized in that the locking bolt 116 comprises the locking pin 534 and the spring 124. The locking pin 534 is movably arranged in the locking bolt 116 in a direction of movement 118 of the locking bolt 116. The locking bolt 116 has a blind hole, in which the spring 124 and the locking pin 534 are arranged. The spring 124 is designed to press the locking pin 534 in a direction of movement 118 of the locking bolt 116 in the direction of the locking gate 112. In the embodiment shown in the FIG. 5 to FIG. 7, one end of the locking pin 534 has a rounded shape.

In the embodiment shown in the FIG. 5 to FIG. 7, the locking bolt 116 has a blind hole, in which are arranged the spring 124 and the locking pin 534. The locking pin 534 has a shape of a bolt. The end of the locking pin 534 facing away from the spring is shaped as a hemisphere. The actuator 114 is an electromagnetic actuator 114, in particular a shift-lock solenoid. The actuator 114 is formed to move locking bolt 116 comprising the locking pin 534 comprehensive to move linearly, said bolt in an activated state of the actuator 114 of locking 116 is moved in the direction of the locking gate 112 and in a non-activated state of the actuator 114 of the locking bolt 116 is moved away from the locking gate 112. The direction of movement 118 of the locking bolt 116 is oriented transversely to the locking gate 112.

The locking gate 112 has a locking recess 122 and another locking recess 230. The locking recess 122 provides a locking of the main shift track 108. The other locking recess 230 provides a locking for the touch-shift track 110. The locking recess 122 has two substantially vertical sidewalls. The sidewalls of the locking recess 122 are aligned in a tolerance range of 10° parallel to the direction 118 of the locking bolt 116. The direction of movement 118 of the locking bolt 116 extends in a tolerance range of 10° to the locking gate 112.

The further locking recess 230 has a sidewall at least partially angled to the direction of movement 118. In the embodiment shown in FIG. 5 to FIG. 7, the sidewall of the further locking recess 230 aligned in the direction of the locking recess 122 is formed as a circular segment, which describes approximately a quarter circle.

The locking device 106 is shown in the FIG. 5 to FIG. 7 in three different states. FIG. 5 shows the locking device 106 in an activated state of the actuator 114, wherein a selector lever of the actuating device comprising the locking device 106 is located in the positions P, R, N, that is in a parking position P, in a position R for a reverse gear or in neutral position N.

FIG. 6 shows the locking device 106 in a non-activated state of the actuator 114, wherein the selector lever of the actuating device comprising the locking device 106 is located in position D for automatic gear selection of the automatic transmission. FIG. 7 shows the locking device 106 in an activated state of the actuator 114, wherein the selector lever of the actuating device comprising the locking device 106 is located in a shifting position for manual shifting. In this case an activated state of the actuator 114 represents with an electro-magnetic actuator 114 an energized state of the actuator 114 and a non-activated state of the actuator 114 a non-energized state of the actuator 114.

FIG. 5 shows a schematic cross-sectional view of the locking device 106, wherein the actuator 114 designed as shift-lock solenoid magnet 114 is supplied with current, and a section of the locking bolt 536 of the locking bolt 116 is arranged in the locking recess 122. The section of the locking bolt 536 arranged in the locking recess 122 has a rounded end. The contour of the locking recess 122 prevents lateral movement of the locking gate 112, that is the contour of the locking recess 122 prevents movement of the locking gate 112 transversely to the direction of movement 118 of the locking bolts 116.

FIG. 6 shows a schematic cross-sectional view of the locking device 106, wherein actuator 114 formed as shift-lock solenoid 114 is energized. The locking bolt 116 is arranged within the actuator 114 in such a way that the locking device 106 is freely movable between the touch-shift track and the main track shift.

FIG. 7 shows a schematic cross-sectional view of the locking device 106, wherein the actuator designed as shift-lock solenoid 114 is energized, and a section of the locking bolt 536 of the locking bolt 116 is arranged in the further locking recess 230. The spring 124 of the locking bolt 116 presses the locking bolt 536 into the further locking recess 230 or against the contour of the other locking recess 230. Thus, the locking bolt 116 or the locking bolt 536 of the locking bolt 116 is held in the further locking recess 230. This results in a holding force for the locking gate 112. When applying a force exceeding said holding force, the locking bolt 536 can be moved against a spring force of the spring 124 along the side wall of the other locking recess 230 at least partially inclined toward the locking recess 122 and moved in the direction of the actuator 114, and thus a selector lever of the actuating device can be moved from the touch-shift track 110 into the main shift track 108.

Figure 8:
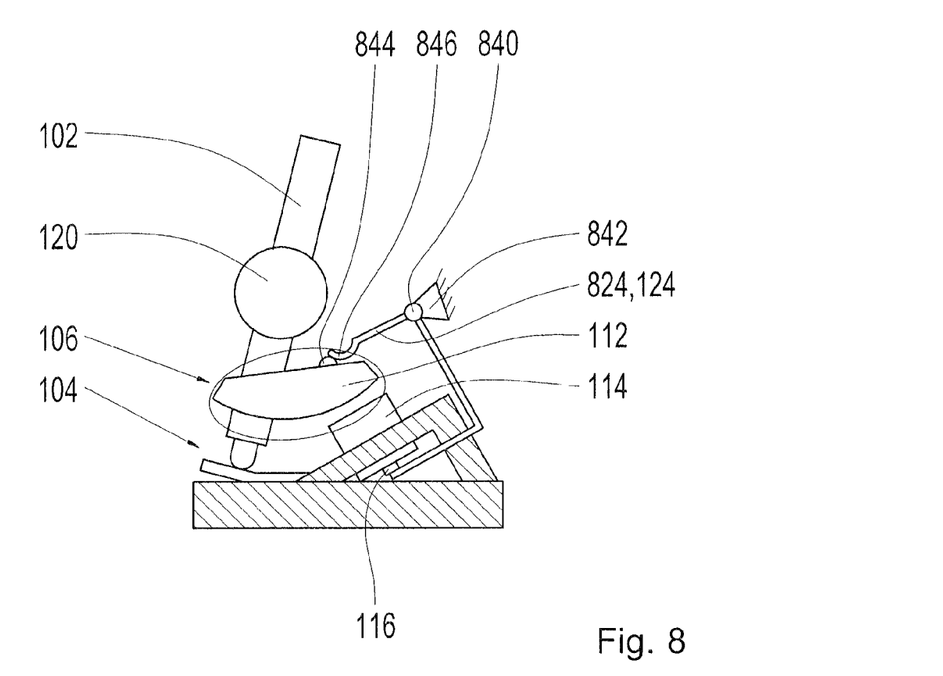
FIG. 8 a section through a schematic actuating device for selecting gears with locking gate according to an embodiment of the present invention.

FIG. 8 shows a section through a schematic actuating device 100 for the selection of gears with a locking gate according to an embodiment of the present invention. The actuating device 100 may be an exemplary embodiment of an actuating device 100 shown in the preceding figures. The illustration in FIG. 8 largely corresponds to the representation in FIG. 3 with the difference of the locking device 106. The locking device 106 comprises an actuator 114, a locking bolt 116 and a locking gate 112. A spring 124 of the locking device 106 is configured as a leaf spring 824. The leaf spring 824 is operatively connected to the locking bolt 116 and mounted to rotate about a pivot point 840. In the pivot point 840, the leaf spring 824 is coupled to a bearing 842. The locking gate 812 comprises a locking lug 844 on the side facing away from an actuator 114. The leaf spring 824 comprises a leaf spring lug 846. In the embodiment shown in FIG. 8, the selector lever 102 is arranged in the touch-shift track 110. The leaf spring lug 846 is in contact with the locking lug 844. The position of the leaf spring lug 846 in relation to the locking lug 844 depending on the state of the actuator or the position of the selector lever 102 is illustrated in the following FIG. 9 to FIG. 11.

Figure 9:
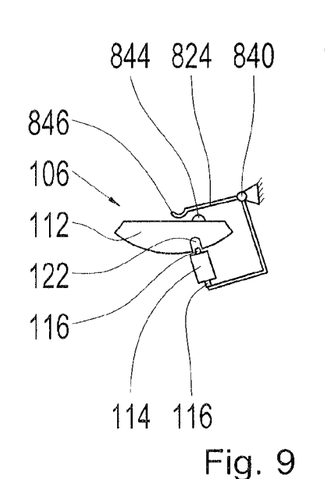
FIG. 9 to FIG. 11 sections through a schematic locking device of an actuating device for selecting gears according to an embodiment of the present invention in different positions of the gear selector lever.
Figure 10:
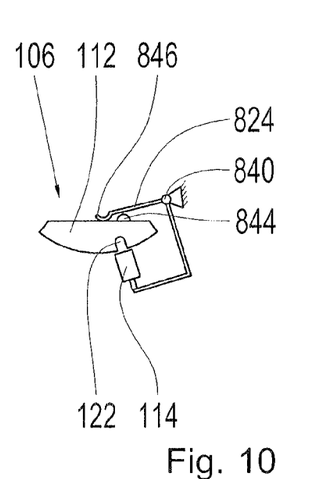
Figure 11:
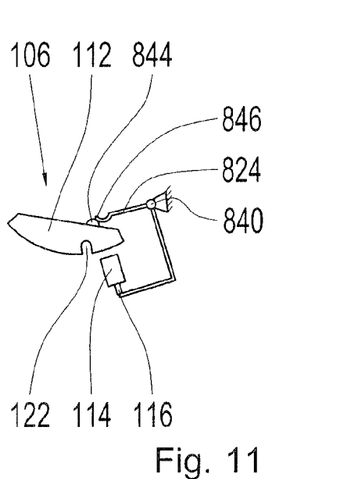

In an embodiment, which is based on the embodiments shown in FIG. 8 to FIG. 11, the function of the pin 536 shown in FIG. 11 in the shift-lock tappet 116 can be "separated" from the function of the tappet 116. This has the advantage that possible abuse forces act on the plunger 116 and not on the pin 536. To this end, a device having a leaf spring 824 is integrated, which is rotated around a fixed pivot point 840 on the housing and thus can take up two end positions. With an energized shift-lock solenoid 114, the leaf spring 824 has no contact with the locking gate 112. The locking gate 112 is also referred to as locking unit 112. Thus, the biased lever 102 in the touch-shift track can slide back into the main shift track. With a de-energized shift-lock solenoid 116, the leaf spring 824 is in contact with a corresponding contour on the locking gate 112. This contour allows only a manual switch between the tracks. The leaf spring force in the transverse direction is greater than a restoring force of the detent.

FIG. 9 to FIG. 11 show a schematic cross-sectional view of a locking device 106 of an actuating device for the selection of gears according to an embodiment of the present invention, with a selector lever 102 in different positions. The actuating device may be for example an actuating device 100 shown in FIG. 1 to FIG. 3 or FIG. 8. The representation of the locking device 106 in FIG. 9 to FIG. 11 has a similarity with the representation of the locking device 106 in FIG. 8. The figures show different positions or states of the locking device 106. The locking device 106 comprises an actuator 114, a locking bolt 116 and a locking gate 112. Furthermore, the locking device 106 comprises a leaf spring 824. The leaf spring 824 is rotatably mounted on a pivot point 840. On one end facing away from the pivot point 840, the leaf spring 824 has a leaf spring lug 846. The locking gate 112 has on one side a locking recess 122. On one side opposite the locking recess 122, the locking gate 112 has a locking lug 844. Both the locking recess 122 and the locking lug 848 are limited by a contour of the locking gate 112. The actuator 116 is operatively connected via the bearing 840 with the leaf spring 824.

The locking device 106 is shown in to FIG. 9 to FIG. 11 in three different states. FIG. 9 shows the locking device 106 in an activated state of the actuator 114, wherein a selector lever of the actuating device comprising the locking device 106 is located in the positions P, R, N, that is in a parking position P, in a position R for a reverse gear, or in the neutral position N. FIG. 10 shows the locking device 106 in a non-activated state of the actuator 114, wherein the selector lever of the actuating device comprising the locking device 106 is located in position D for automatic gear selection of the automatic transmission. FIG. 11 shows the locking device 106 in a non-activated state of the actuator 114, wherein the selector lever of the actuating device comprising the locking device 106 is located in a switching position for manual shifting. In this case, an activated state of the actuator 114 in an electro-magnetic actuator 114 represents an energized state of the actuator 114 and a non-activated state of the actuator 114 represents a non-energized state of the actuator 114. In an embodiment, the actuator 114 is formed as a shift-lock solenoid 114.

In FIG. 9 the locking bolt 116 engages in the locking recess 122 and fixed the locking gate 112 or locks a selector lever in the main shift track operatively connected to a locking device 106. The leaf spring 824 operatively connected to the locking bolt 116 is without contact to the locking lug 844 and without contact to the locking gate 112. In the state of the locking device 106 shown in FIG. 9, the leaf spring 824 exerts no holding force on the locking gate 112 or the locking device 106.

In FIG. 10 the actuator 114 is shown in an energized state. The locking bolt 116 is not engaged with the locking recess 122. The leaf spring 824 is in contact with the locking lug 844. The leaf spring 824 is in contact with the locking gate 112. The leaf spring 824 exerts a predefined holding force on the locking gate 112. The holding force can be referred to as a leaf spring force in transverse direction.

The transverse direction is aligned transversely to the movement direction of the locking bolts 116 in a tolerance range of up to 30°. The position or location of the locking device 106 requires that a selector lever 102 coupled with the locking device 106 is located within the main shift track.

FIG. 11 shows the locking device 106 in a position or in a state in which a selector lever 102 coupled with the locking device 106 is located in the touch-shift track. In contrast to FIG. 10, the leaf spring 846 is arranged on the side of the locking lug 844 opposite to the position shown in FIG. 10. The leaf spring 824 exerts a holding force on the locking gate 112. The holding force exerted by the leaf spring 824 on the locking device 106 can be reduced in that the actuator 114 is partially activated and thus the locking bolt 116 is at least partially moved in the direction of the locking gate 112. This reduces the holding force emanating from the leaf spring 824 and acting on the locking gate 112.

Figure 12:
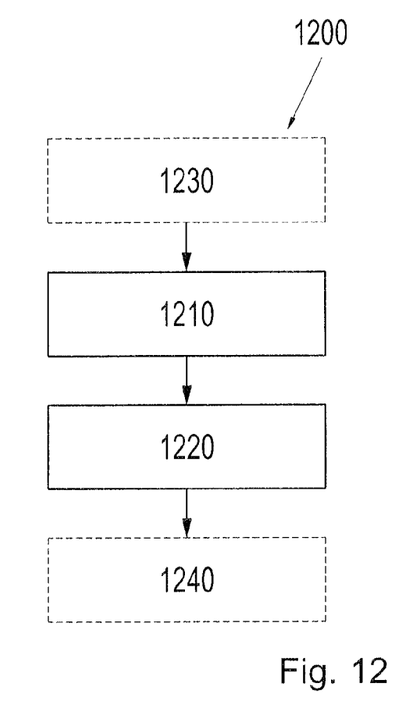
FIG. 12 a flow chart of a method for locking an actuating device according to one embodiment of the present invention.

FIG. 12 shows a flow chart of a method 1200 for locking an actuating device according to an embodiment of the present invention. The actuating device may be an embodiment of an actuating device 100. The method includes a step 1210 of locking the locking device in the touch-shift track, wherein a spring force creating the locking is greater than the restoring force of the latch mechanism of the actuating device, and a step 1220 of releasing the locking device, so that the selector lever is moved by means of the restoring force of the latch mechanism from the touch-shift track to the main shift track.

Optionally, the method 1200 includes before step 1210 of locking a step 1230 of activating the actuator. In step 1230 of activating, the actuator of the locking device is activated in response to a control signal when the selector lever is in the world-class, to lock the selector lever in the world class.

Optionally, after step 1220 of releasing the locking device, the method 1200 includes a step 1240 of releasing the actuator so that the selector lever is movable from the world-class to the touch-shift track.

Figure 13:
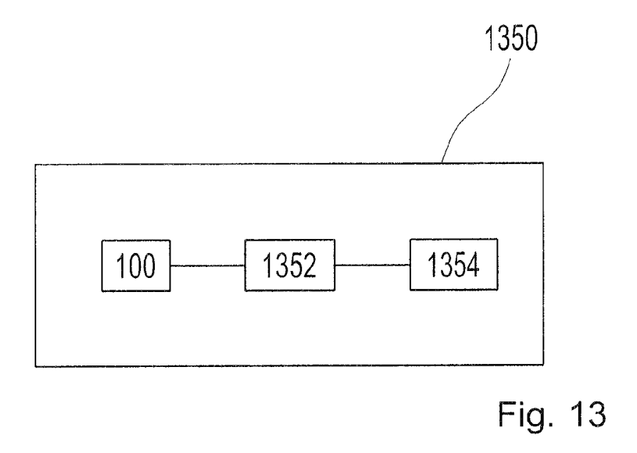
FIG. 13 a schematic representation of a vehicle in which an actuating device is installed for the selection of gears according to an embodiment of the present invention.

FIG. 13 shows a schematic representation of a vehicle 1350 in which an actuating device 100 is installed for the selection of gears according to an embodiment of the present invention. The vehicle 1350 has an actuating device 100 for the selection of gears for a change gear transmission 1352, a corresponding change gear transmission in 1352 and a motor 1354. The actuating device 100 is connected to the change gear transmission 1352. The change gear transmission 1352 is coupled to the rotor 1354. In an embodiment, the change gear transmission in 1352 is an automatic transmission 1352 with a shift-by-wire actuation. Thus, the actuating device 100 and the change gear transmission 1352 are connected via a control line, wherein in particular, electrical control signals are transmitted via the control line.

With a gear 1352 with the shift-by-wire technology, or a gear 1352, which is connected via the shift-by-wire technology with an actuating device 100, a gear change request or a so-called driver's wish, i.e. the automatic transmission position desired by a driver or operator is not transmitted mechanically but electrically or electronically. The driver's wish is converted in the actuating device 100 into an electrical signal and transmitted to a control unit of the gearbox 1352, which drives an actuator or a position controller in the automatic transmission. The electronic control allows to automatically switch any shift pattern. A program control can control the switching operation in response to a presence of predetermined switching conditions or detected operating parameters. Thus the shifting operation can be controlled in response to sensed operating parameters without an explicit driver command. Thus, for example, with a parked car 1350 the control can shift the transmission 1352 into a parking lock position without receiving a request of the driver of the vehicle.

The embodiments described and shown in the figures are chosen only by way of example. Different embodiments can be combined wholly or in respect of individual characteristics. Also an embodiment may be supplemented by features of another embodiment.

Furthermore, the steps of the invention may be repeated and executed in a sequence other than the sequence described.

If an embodiment includes an "and/or" link between a first feature and a second feature, it may be read so that the embodiment according to one form includes both the first feature and the second feature and according to another embodiment, it includes either only the first feature or the second feature.

REFERENCE NUMERALS

100 Actuating device
102 Selector lever
104 Latch mechanism
106 Locking device
108 Main shift track
110 Touch-shift track
112 Locking gate
114 Actuator
116 Locking bolt
118 Direction of movement
120 Ball joint
122 Locking recess
124 Spring
126 Locking pin
128 Latching guide
230 Further locking recess
232 Housing
434 Additional locking recess
536 Locking bolt
824 Leaf spring
840 Pivot point 842 Bearing
844 Locking lug
846 Leaf spring lug
1200 Method
1210 Step of locking
1220 Step of releasing
1230 Step of activating
1240 Step of releasing
1350 Vehicle
1352 Transmission
1354 Motor

What is claimed is:

1. An actuating device for selecting gears for a change gear transmission for an automatic transmission with shift-by-wire actuation, the actuating device comprising:
    a selector lever that is movable in a main shift track and a touch-shift track, and is movable between the main shift track and the touch-shift track via a changing track;
    a latch mechanism that comprises a latching guide having a contour configured to urge the selector lever to slip from the touch-shift track into the main shift track;
    a locking device comprising a locking gate having a first locking recess and a second locking recess, an actuator, a locking bolt disposed at least partially within the actuator, and a spring disposed at an end of the locking bolt to urge the locking bolt out of the actuator and to thereby cause the locking bolt to engage at least one of the first locking recess or the second locking recess;
    wherein when engaged in the first locking recess, an amount of force by which the locking bolt engages the first locking recess prevents movement of the selector lever from the touch-shift track to the main shift track by way of the urging of the latching guide of the latch mechanism;
    wherein when the actuator is activated, the amount of force by which the locking bolt engages the first locking recess is reduced, to thereby allow the selector lever to move from the touch-shift track to the main shift track by way of the urging of the latching guide of the latch mechanism; and
    wherein, at a location where the selector lever is movable from the main shift track to touch-shift track via the changing track, the second locking recess comprises, in a section positioned between the first locking recess and the second locking recess, a side wall aligned substantially parallel to a direction of movement of the locking bolt such that, when the locking bolt engages the second locking recess, the selector lever is prevented from moving from the main shift track to the touch-shift track.

2. The actuating device of claim 1, wherein the actuator is designed as an electromagnet.

3. The actuating device of claim 2, wherein a side wall of the first locking recess arranged in a direction of the second locking recess is oriented at least partially obliquely to the direction of movement of the locking bolt.

4. The actuating device of claim 2, wherein at least one of the first locking recess or the second locking recess has a longitudinal extension and is aligned in a tolerance range parallel to at least one of the main shift track or the touch-shift track, wherein the longitudinal extension has a length greater than a width of the at least one of the first locking recess or the second locking recess.

5. The actuating device of claim 2, wherein the locking bolt has a locking pin that is movably arranged in the locking bolt in the direction of movement of the locking bolt within the actuator, wherein the spring is configured to press the locking bolt in the direction of movement of the locking bolt in a direction of the locking gate and wherein the locking bolt has the locking pin which has a rounded shape in a section engageable in the locking gate.

6. The actuating device of claim 1, wherein a side wall of the first locking recess arranged in a direction of the second locking recess is oriented at least partially obliquely to the direction of movement of the locking bolt.

7. The actuating device of claim 1, wherein at least one of the first locking recess or the second locking recess has a longitudinal extension and is aligned in a tolerance range parallel to at least one of the main shift track or the touch-shift track, wherein the longitudinal extension has a length greater than a width of the at least one of the first locking recess or the second locking recess.

8. The actuating device of claim 1, wherein the locking bolt has a locking pin that is movably arranged in the locking bolt in the direction of movement of the locking bolt within the actuator, wherein the spring is configured to press the locking bolt in the direction of movement of the locking bolt in a direction of the locking gate and wherein the locking bolt has the locking pin which has a rounded shape in a section engageable in the locking gate.

9. The actuating device of claim 1, wherein when the actuator is activated, the selector lever is capable of movement in the main shift track and in the touch-shift track and back and forth between the main shift track and the touch-shift track, and wherein when the actuator is not activated, the selector lever is capable of movement in the main shift track and in the touch-shift track and from the touch-shift track to the main shift track.

10. The actuating device of claim 1, wherein the spring is formed as a spring operatively connected to the locking bolt, which is rotatably mounted about a pivot point.

11. The actuating device of claim 10, wherein the locking device has a locking lug, and wherein a leaf spring lug of the spring at a first state of the actuator is in contact with the locking lug.

12. The actuating device of claim 11, wherein the leaf spring lug in a second state of the actuator is free of contact to the locking lug or the leaf spring lug in the second state of the actuator exerts on the locking lug a lower holding force than the restoring force of the latch mechanism.

13. The actuating device of claim 1, wherein the spring is formed as a leaf spring.

14. The actuating device of claim 13, wherein the locking device has a locking lug, and wherein a leaf spring lug of the spring at a first state of the actuator is in contact with the locking lug.

15. The actuating device of claim 14, wherein the leaf spring lug in a second state of the actuator is free of contact to the locking lug or the leaf spring lug in the second state of the actuator exerts on the locking lug a lower holding force than the restoring force of the latch mechanism.

* * * * *